United States Patent
Busch

(10) Patent No.: US 6,274,991 B1
(45) Date of Patent: Aug. 14, 2001

(54) METHOD AND CIRCUIT CONFIGURATION FOR DETECTING THE ROTATIONAL SPEED OF ELECTRONICALLY COMMUTATED FANS

(75) Inventor: Peter Busch, Augsburg (DE)

(73) Assignee: PCS PC-Systeme Entwicklungs-und Produktionsgesellschaft mbH & Co. KG, Augsburg (DE)

( * ) Notice: Subject to any disclaimer, the term of this patent is extended or adjusted under 35 U.S.C. 154(b) by 0 days.

(21) Appl. No.: 09/642,331

(22) Filed: Aug. 21, 2000

Related U.S. Application Data

(63) Continuation of application No. PCT/DE99/00174, filed on Jan. 25, 1999.

(30) Foreign Application Priority Data

Feb. 20, 1998 (DE) ............................................. 198 07 253

(51) Int. Cl.[7] ..................... G06F 15/332; H02K 23/64; H02P 6/06; H02P 5/16
(52) U.S. Cl. ..................... 318/254; 318/245; 318/434; 318/599
(58) Field of Search ..................... 318/138, 245, 318/254, 293, 430–499, 599, 278; 165/1, 39, 40, 299; 324/161, 783, 160; 388/822, 908, 813; 361/20–32; 236/35, 78 D; 340/635, 641, 648

(56) References Cited

U.S. PATENT DOCUMENTS

| | | | |
|---|---|---|---|
| 4,475,070 | * 10/1984 | Wilkerson | 318/338 |
| 4,527,101 | * 7/1985 | Zavis et al. | 318/245 |
| 4,823,060 | * 4/1989 | Doemen | 318/464 |
| 4,924,420 | * 5/1990 | Hadley et al. | 364/569 |
| 4,928,045 | * 5/1990 | Doemen | 318/464 |
| 4,955,431 | * 9/1990 | Saur et al. | 165/1 |
| 5,153,492 | * 10/1992 | Landseadel | 318/599 |
| 5,448,143 | * 9/1995 | Pecone | 318/434 |
| 5,654,654 | * 8/1997 | Franklin | 327/103 |
| 5,717,302 | * 2/1998 | Sakai et al. | 318/374 |
| 5,718,373 | * 2/1998 | Kim et al. | 236/35 |
| 5,731,671 | * 3/1998 | Adam et al. | 318/254 |
| 5,862,301 | * 1/1999 | Gontowski | 388/800 |
| 5,889,469 | * 3/1999 | Mykytiuk et al. | 340/635 |
| 6,008,603 | * 12/1999 | Jones et al. | 318/254 |
| 6,023,139 | * 2/2000 | Chin | 318/434 |

FOREIGN PATENT DOCUMENTS 26 17 131 A1   1/1977   (DE).
196 01 040 A1   7/1996   (DE).

OTHER PUBLICATIONS

SGS Halbleiter GmbH (ed.): "Motor Control Seminar 1986", E15 –E18.
Herbert Sax: "Tachoregelung ohne Tachogenerator"[ tacho controller without tacho pulse generator], Elektronik Aug. 10, 1984, XP–002105032.

* cited by examiner

Primary Examiner—Paul Ip
(74) Attorney, Agent, or Firm—Herbert L. Lerner; Laurence A. Greenberg; Werner H. Stemer

(57) ABSTRACT

A method and a circuit configuration for detecting the rotational speed of electronically commutated fans include measuring maximum current gradients of current fluctuations caused by the fan on its power supply lines, and adapting an amplification range and switching threshold of a comparator used as an input stage for a pulse former.

8 Claims, 2 Drawing Sheets

METHOD AND CIRCUIT CONFIGURATION FOR DETECTING THE ROTATIONAL SPEED OF ELECTRONICALLY COMMUTATED FANS

CROSS-REFERENCE TO RELATED APPLICATION:

This application is a continuation of copending International Application No. PCT/DE99/00174, filed Jan. 25, 1999, which designated the United States.

BACKGROUND OF THE INVENTION:

Field of the Invention

The invention relates to a method for detecting the rotational speed of electronically commutated fans, in which the rotational speed is indicated by a clock signal having a corresponding number of clock pulses per unit time. The invention also relates to a circuit configuration for detecting the rotational speed of electronically commutated fans, including a device for producing a clock signal with a corresponding number of clock pulses per unit time corresponding to the rotational speed of the fan.

Relatively powerful power supply units need electronically commutated fans to cool them. Electronically commutated fans cause current fluctuations on their power supply lines, which vary from fan to fan and not only from fan type to fan type.

In order to monitor and to control the fans, the rotational speed of the fans has to be detected electronically to derive a clock signal therefrom having an appropriate or corresponding number of clock pulses per unit time.

It is known for special fans to be used which pass an internal clock signal to the exterior from the electronic commutation through an additional line as a clock signal as mentioned above (see Papst Catalog, Equipment Fans, 94/95, Papst-Motoren GmbH & Co KG, Karl-Maier-Straße 1, D-78112 St. Georgen/Schwarzwald, P.O. Box 1435, in the Chapter entitled "Equipment fans for DC voltage" and "Variants"). The disadvantage thereof is that such special fans are expensive.

It is also known for the current fluctuations which are caused by a fan to be detected by a current measurement resistor, to be filtered out through a high-pass filter, and then to be supplied to a pulse former in order to form the clock pulses of the clock signal mentioned above (German Published, Non-Prosecuted patent application 26 17 131, corresponding to U.S. Pat. No. 4,097,789). The disadvantage thereof is that the level and the form of the current fluctuations which are caused by the fan on its power supply lines differ to such an extent from fan to fan that matching to each fan is required.

Furthermore, German Published, Non-Prosecuted Patent Application DE 196 01 040 A1 discloses a method and a circuit configuration for detecting the rotational speed of electronically commutated fans, in which the rotational speed is indicated by a clock signal with an appropriate number of clock pulses per unit time, and a DE Company Document: "Motor Control Seminar 1986", page E15, SGS Halbeiter Bauelemente GmbH, April 1986, discloses the use of maximum current gradients for measuring current fluctuations which are caused by fans on the power supply lines as a function of the rotational speed, and deriving clock signals for rotational speed information therefrom.

SUMMARY OF THE INVENTION:

It is accordingly an object of the invention to provide a method and a circuit configuration for detecting the rotational speed of electronically commutated fans, which overcome the hereinafore-mentioned disadvantages of the heretofore-known devices and methods of this general type and with which the rotational speed of electronically commutated fans can be detected at low cost and in a simple way.

With the foregoing and other objects in view there is provided, in accordance with the invention, a method for detecting the rotational speed of electronically commutated fans, which comprises indicating a rotational speed of an electronically commutated fan with a clock signal having a corresponding number of clock pulses per unit time; forming the clock pulses of the clock signal with a pulse former having a comparator serving as an input stage; measuring maximum current gradients of current fluctuations caused by the fan on power supply lines of the fan as a function of the rotational speed; and automatically adapting an amplification range and switching threshold of the comparator in dependence on a result of the measurement.

With the objects of the invention in view, there is also provided a circuit configuration for detecting the rotational speed of electronically commutated fans, comprising a device for producing a clock signal with a corresponding number of clock pulses per unit time corresponding to a rotational speed of an electronically commutated fan having power supply lines; a pulse former forming the clock pulses of the clock signal; a comparator serving as an input stage for the pulse former; a device for detecting maximum current gradients of current fluctuations caused by the fan on the power supply lines; and a device for automatically adapting an amplification range and switching threshold of the comparator.

The method and the circuit configuration make expensive special fans superfluous, so that the rotational speed can be detected at low cost. Furthermore, the respective matching measures to any fan which is used are superfluous, so that the rotational speed can likewise be detected in a simple way. So-called normal fans of all types may be used. The adaptation to a respective fan is carried out automatically.

Empirical measurements on a large number of different fans and fan types have shown that the current fluctuations which are caused by them on their power supply lines generally occur with considerably more severe negative current gradients than positive gradients. More accurate results thus allow rotational speed detection based on the negative current gradients of the current fluctuations. However, in the relatively small number of fans and fan types in which the positive current gradients are more severely pronounced than the negative current gradients, the negative current gradients are still sufficiently strongly pronounced that reliable and accurate detection of the rotational speed of the fans can always be ensured.

Thus, in accordance with another mode of the invention, the negative current gradients of the current fluctuations which are caused by a fan on its power supply lines are used to evaluate the rotational speed.

In accordance with a further mode of the invention, not only the amplification range and the switching threshold of a comparator, but also the determined maximum negative current gradients are matched in an appropriate ratio, which results in the provision for rotational speed detection immediately assuming a steady state once again.

In accordance with an added mode of the invention, the automatic adaptation is carried out in discrete steps. The implementation complexity is thus less than for continuous matching.

The above-mentioned considerations in this case apply not only to the method but also to the circuit configuration.

Other features which are considered as characteristic for the invention are set forth in the appended claims.

Although the invention is illustrated and described herein as embodied in a method and a circuit configuration for detecting the rotational speed of electronically commutated fans, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
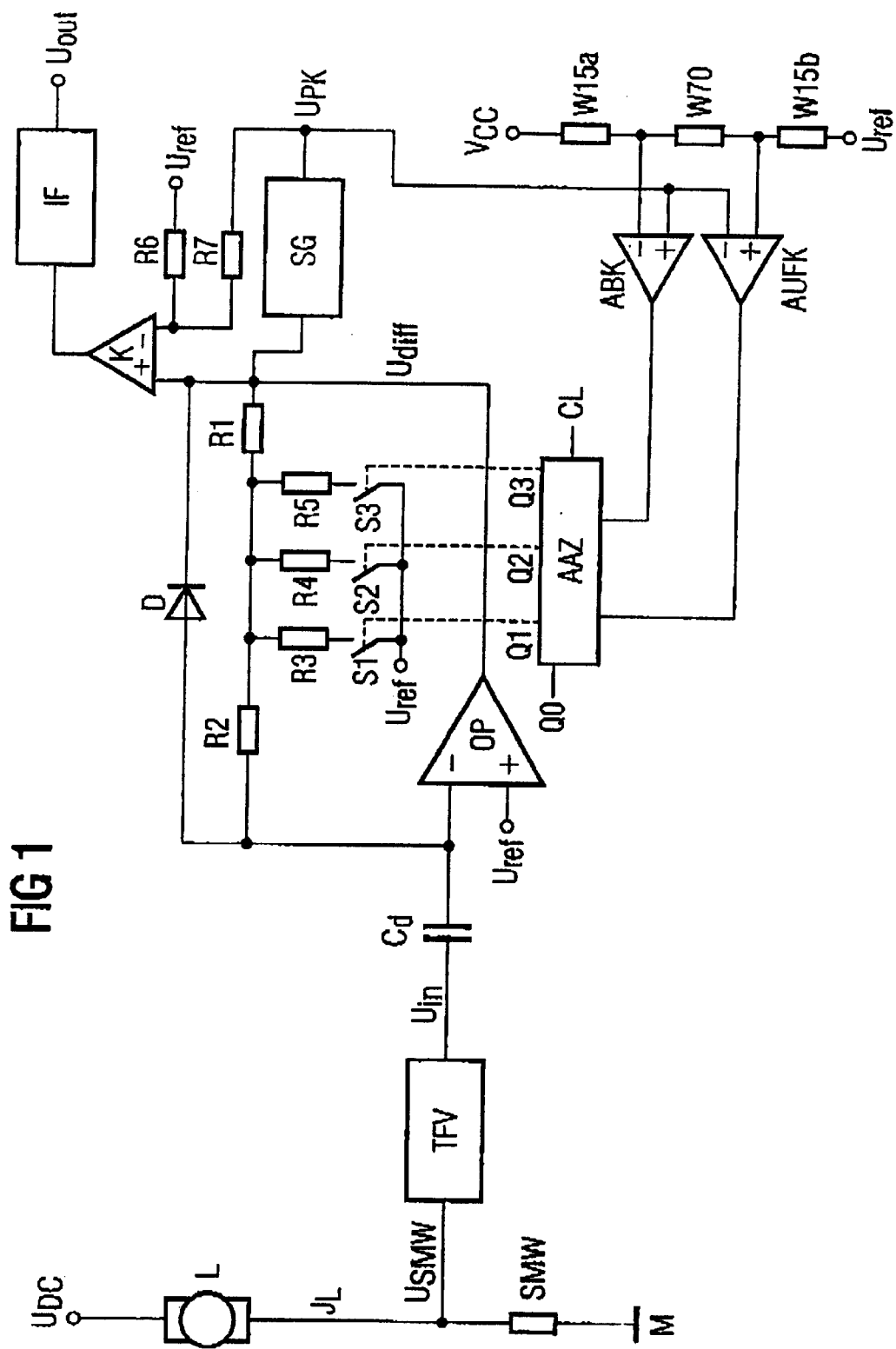
FIG. 1 is a schematic and block diagram of a circuit configuration for detecting the rotational speed of electronically commutated fans according to the invention.

Referring now to the figures of the drawings in detail and first, particularly, to FIG. 1 thereof, there is seen an electronically commutated fan L, which is also merely referred to as a fan L in the following text, and a current measurement resistor SMW, that are disposed in series in a power path which is connected between a power supply point $U_{DC}$ and a ground reference point M. The path includes power supply lines associated with the fan L, on which fan current $J_L$ flows.

Figure 2:
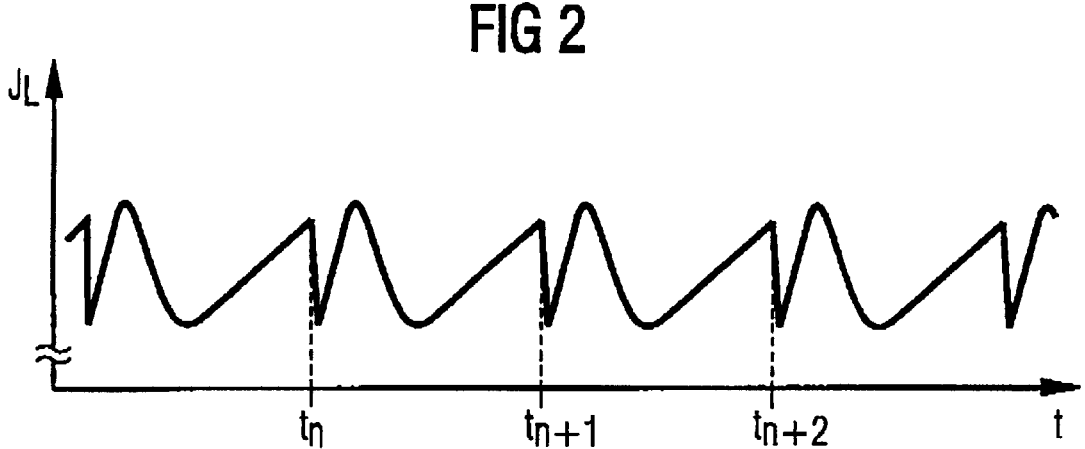
FIG. 2 is a diagram showing current fluctuations, which are caused by a fan on its power supply lines, as a point of origin for detecting rotational speeds through the use of a circuit configuration as shown in FIG. 1.

Due to the electronic commutation of the fan L, the fan current $J_L$ has fluctuations, which are shown qualitatively in a diagram in FIG. 2. The diagram should be read to mean that the fan current has an essentially constant DC element over a relatively long time period, on which very rapid current fluctuations are superimposed. The current fluctuations are caused by the commutation of the motor windings of the fan. Times $t_n, t_{n+1}$ and $t_{n+2}$ are marked specifically in FIG. 2 to represent recurrent commutation times. A commutation process takes place at these times, as a result of which the fan current initially decreases very rapidly and severely. It then rises once again on a somewhat flatter curve, and even overshoots. As the profile continues, the fan current decreases once again, but over a relatively long time period. Finally, it rises once again over an even longer time period until the next commutation process then takes place, and the processes are repeated.

Intervals between the individual times of the commutation process, for example times $t_n$, $t_{n+1}$ and $t_{n+2}$, in this case depend directly on the instantaneous applicable rotational speed of the fan. The faster the fan is turning, the shorter the intervals and the greater the number of times that occur per unit time. Furthermore, the current gradients of the current fluctuations vary.

The curve profiles and the number of commutation times per unit time depend on the structure of the fan motor winding.

Some fan motors have more poles, and others less. Each motor winding must be commutated once or more during one revolution depending on the structure, so that the number of commutation times per revolution also depends on the number of poles and windings in the fan motor, irrespective of the rotational speed of the fan motor. However, there is always a limited time period between two commutation times in which there is at least one sufficiently pronounced negative current drop with a locally maximum current gradient.

The current measurement resistor SMW can be used to tap off a current measurement resistor voltage $U_{SMW}$ at a point between the current measurement resistor SMW and the fan L. The voltage $U_{SMW}$ represents the events shown in FIG. 2 as a voltage. This voltage is tapped off from a low-pass filter and amplifier TFV and is passed on as an input voltage $U_{in}$ through an input capacitor $C_d$ to a rotational speed detection circuit, which will be explained in more detail in the following text.

The rotational speed detection circuit has an operational amplifier OP with a negative (inverting) input and a positive (non-inverting) input. A reference voltage $U_{ref}$ is connected to the positive input, while the input voltage $U_{in}$ is passed through the input capacitor $C_d$ and applied to the negative input.

An output and the negative input of the operational amplifier OP are connected into two parallel paths. A series circuit including two resistors R1 and R2 is disposed in one path. A diode D is disposed in the other path and is connected in such a way that its forward direction is from the negative input to the output of the respective operational amplifier OP.

The output of the operational amplifier OP is connected firstly to a positive input of a comparator K, and secondly to an input of a peak-value detector SG. An output of the peak-value detector SG is connected through a resistor R7 to a negative input of the comparator K, to a positive input of a down comparator ABK and to a negative input of an up comparator AUFK.

The down comparator ABK and the up comparator AUFK are connected to a series circuit including three resistors W15a, W70 and W15b. More specifically, a negative input of the down comparator ABK is connected between the resistors W15a and W70, and a positive input of the up comparator AUFK is connected between the resistors W70 and W15b.

The series circuit including the three resistors W15a, W70 and W15b is connected at one end to a supply voltage $V_{cc}$, and at another end to the reference voltage $U_{ref}$.

The negative input of the comparator K is connected not only to the resistor R7 but also to a resistor R6, to which the reference voltage $U_{ref}$ is connected. An output of the comparator K is connected to a pulse former IF, having an output at which an output voltage $U_{out}$ can be tapped off.

An output of the down comparator ABK and an output of the up comparator AUFK are connected to respective inputs of an up/down counter AAZ. The up/down counter AAZ has four counting outputs Q0, Q1, Q2 and Q3. Three higher-value outputs Q1, Q2 and Q3 thereof are each connected to a respective switch S1, S2 and S3, in order to control them.

The switches S1, S2 and S3 are connected to a point between the resistors R1 and R2. The switches S1, S2 and S3 divide an output voltage $U_{diff}$ of the operational amplifier OP over the resistor R1 and respective resistors R3, R4 and R5, with respect to the reference voltage $U_{ref}$, in a manner corresponding to the values of these resistors.

The output voltage $U_{diff}$ produced by the operational amplifier OP has a peak value which is converted to an output peak voltage $U_{PK}$ by the peak value detector SG.

The fan current $J_L$ is detected by the current measurement resistor SMW. High-frequency disturbances on the power supply lines of the fan L are removed in the low-pass filter and amplifier TFV, without filtering out the current fluctuations of the fan L. For example, the cut-off frequency for filtering may be set at 10 kHz.

After the low-pass filter and amplifier TFV, the negative current gradient of the fan current $J_L$ is detected by the input capacitor $C_d$, the operational amplifier OP and the resistors R1 and R2. A sum R=R1+R2 of the individual resistors R1 and R2 together with the switched-off switches S1, S2 and S3 gives the following general relationship for the output voltage $U_{diff}$:

$$U_{diff}=(-R*C_d* dU_{in}/dt)$$

The peak value of the output voltage $U_{diff}$ is then detected as the output peak voltage $U_{PK}$ and a permanently set proportion of it is passed to the comparator K as a comparison value. The highest periodically recurring current gradients now lead to an output pulse, by comparison with the output voltage $U_{diff}$. The sum of the output pulses may be used as a clock signal, and the individual output pulses may be used as a clock pulse.

As mentioned initially, the current gradients of the individual fans differ from one another to a major extent. In the extreme, they may vary by a factor of 1000. In the case of a fan having a low current gradient, the output peak voltage $U_{PK}$ will be very low. For example, it may be less than 15% of the difference between the supply voltage $V_{cc}$ and the reference voltage $U_{ref}$. However, the output peak voltage $U_{PK}$ has an internally permanently set minimum value which is greater than the reference voltage $U_{ref}$ by at least a positive disturbance level on the output voltage $U_{diff}$ with respect to that reference voltage $U_{ref}$.

The up/down counter AAZ now counts upward by 1, that is to say it switches from its count output Q0 to its count output Q1. The switch S1 switches on. This results in the resistors R1 and R3 forming a divider. Only a portion of the output voltage $U_{diff}$ is now applied to the resistor R2. This increases the overall gain of the circuit part which acts as a differentiator around the operational amplifier OP. The ratio formed by the voltage division ratio of the resistors R2 and R3 (in parallel) and R1 in the input of the operational amplifier OP results in the following amplification of the input gradient:

$$U_{diff}=(-R2*C_d*dU_{in}/dt* 1/\text{ratio}).$$

The increase in the amplification is now chosen to be less than the ratio of the switching thresholds for the up/down comparators ABK, AUFK. This prevents continuous switching backward and forward.

In the exemplary embodiment, the factor could be chosen to be 4. At the same time, the output peak voltage $U_{PK}$ of the peak value detector SG is increased by the same factor, in order to produce a steady state once again, immediately.

If the amplification is not yet sufficient, the next switch S2 is then switched on after a predetermined transient time and, if necessary, the further switch S3 will then also be switched on after this. At the same time, the output peak voltage $U_{PK}$ is once again matched to the new amplification ratios. The circuit part which acts as a differentiator now works in an optimum operating range.

If, for example due to an increase in the operating voltage at the fan L, the current gradients increase and the output peak voltage $U_{PK}$ becomes very high, for example greater than 85% of the difference between the supply voltage $V_{cc}$ and the reference voltage $U_{ref}$, the down comparator ABK will switch on. The up/down counter AAZ will count downward by 1, that is to say, for example, from its count output Q3 to its count output Q2. In consequence, the overall amplification is reduced, and the output voltage $U_{diff}$ will once again be in the optimum operating range. At the same time, the output peak voltage $U_{PK}$ is matched to the new amplification ratios once again. Overall, the output voltage $U_{diff}$ can once again be detected correctly by the comparator K.

The amplification factors are stepped uniformly with respect to one another in each case. In the exemplary embodiment, the up/down counter AAZ stops counting upward at the latest when the count output Q3 is activated. When counting downward, it stops when the count output Q0 is activated.

The diode D sets a very low amplification ratio for positive current gradients.

The pulse former IF suppresses double pulses, for example if the commutation pulses of the fan L are noisy.

The increase or reduction in the output peak voltage $U_{PK}$ is particularly simple if the peak value detector SG stores its output peak voltage $U_{PK}$ digitally in the form of a count and the setting factor is a positive or negative power of 2, that is to say, for example, 4 or ¼. In this case, the count need only be shifted by one or more bit positions to the right or left in order to match the content to the new amplification ratio.

The above-described method for detecting rotational speeds can also be used for electric motors which have a similar motor current characteristic to that of motors for electronically commutated fans.

I claim:

1. A method for detecting the rotational speed of electronically commutated fans, which comprises:

indicating a rotational speed of an electronically commutated fan with a clock signal having a corresponding number of clock pulses per unit time;

forming the clock pulses of the clock signal with a pulse former having a comparator serving as an input stage;

measuring maximum current gradients of current fluctuations caused by the fan on power supply lines of the fan as a function of the rotational speed; and automatically adapting an amplification range and switching threshold of the comparator in dependence on a result of the measurement.

2. The method according to claim 1, which further comprises measuring negative current gradients during the measurements of the current gradients of the current fluctuations caused by the fan on its power supply lines.

3. The method according to claim 1, which further comprises carrying out a corresponding adaptation of the measured maximum current gradients of the current fluctuations caused by the fan on its power supply lines, in each case corresponding to the adaptation of the amplification range and switching threshold of the comparator.

4. The method according to claim 1, which further comprises carrying out at least the automatic adaptation of the amplification range and switching threshold of the comparator in discrete steps.

5. A circuit configuration for detecting the rotational speed of electronically commutated fans, comprising:

a device for producing a clock signal with a corresponding number of clock pulses per unit time corresponding to a rotational speed of an electronically commutated fan having power supply lines;

a pulse former forming the clock pulses of the clock signal;

a comparator serving as an input stage for said pulse former;

a device for detecting maximum current gradients of current fluctuations caused by the fan on the power supply lines; and a device for automatically adapting an amplification range and switching threshold of said comparator.

6. The circuit configuration according to claim 5, wherein said device for detecting current gradients exclusively detects negative current gradients.

7. The circuit configuration according to claim 5, including a device for adapting the detected maximum current gradients corresponding to the adaptation of the amplification range and switching threshold of said comparator.

8. The circuit configuration according to claim 5, wherein said device for adaptation of the amplification range and switching threshold of said comparator and for corresponding adaptation of the detected maximum current gradients carries out a respective adaptation in at least one discrete step in each case.

* * * * *